US007383826B2

(12) United States Patent
Kano et al.

(10) Patent No.: US 7,383,826 B2
(45) Date of Patent: Jun. 10, 2008

(54) FUEL VAPOR TREATMENT APPARATUS, SYSTEM HAVING THE SAME, METHOD FOR OPERATING THE SAME

(75) Inventors: Masao Kano, Gamagori (JP); Shinsuke Takakura, Kariya (JP); Noriyasu Amano, Gamagori (JP)

(73) Assignees: Denso Corporation (JP); Nippon Soken Inc. (JP)

( * ) Notice: Subject to any disclaimer, the term of this patent is extended or adjusted under 35 U.S.C. 154(b) by 25 days.

(21) Appl. No.: 11/647,326

(22) Filed: Dec. 29, 2006

(65) Prior Publication Data

US 2007/0157908 A1 Jul. 12, 2007

(30) Foreign Application Priority Data

Jan. 11, 2006 (JP) ............................ 2006-003430

(51) Int. Cl.
*G01M 3/04* (2006.01)
*F02M 25/08* (2006.01)

(52) U.S. Cl. ........................ 123/518; 123/520; 73/40.7

(58) Field of Classification Search ................ 123/516, 123/518–520, 198 D; 73/40, 40.7, 118.1, 73/119 A
See application file for complete search history.

(56) References Cited

U.S. PATENT DOCUMENTS 5,203,870 A * 4/1993 Kayanuma et al. ..... 123/198 D
5,263,461 A * 11/1993 Fujimoto et al. ........... 123/520
5,560,347 A * 10/1996 Reddy et al. ............... 123/520
5,666,924 A * 9/1997 Kadota ....................... 123/520
6,119,663 A * 9/2000 Okuma ....................... 123/520
6,161,424 A * 12/2000 Kidokoro et al. ............ 73/49.2
6,371,089 B1 * 4/2002 Matsuoka et al. .......... 123/519
6,932,068 B2 * 8/2005 Osanai ....................... 123/674
7,017,558 B2 * 3/2006 Osanai ....................... 123/520

FOREIGN PATENT DOCUMENTS

JP 5-18326 1/1993
JP 6-101534 4/1994

* cited by examiner

*Primary Examiner*—Thomas N Moulis
(74) *Attorney, Agent, or Firm*—Nixon & Vanderhye PC

(57) ABSTRACT

A fuel vapor treatment apparatus connects with a fuel tank, which produces fuel vapor to be purged into an intake passage of an internal combustion engine through a purge passage. The fuel vapor treatment apparatus includes a state measuring unit that includes a measurement passage provided separately from the purge passage. When the measurement passage is blocked from the intake passage, the state measuring unit measures a state of fuel vapor by detecting a physical quantity of the fuel vapor in the measurement passage. The physical quantity is correlative to the state of fuel vapor. The fuel vapor treatment apparatus further includes a diagnosis unit for diagnosing a malfunction of at least one of components of the state measuring unit.

21 Claims, 14 Drawing Sheets

FUEL VAPOR TREATMENT APPARATUS, SYSTEM HAVING THE SAME, METHOD FOR OPERATING THE SAME

CROSS REFERENCE TO RELATED APPLICATIONS

This application is based on and incorporates herein by reference Japanese Patent Application No. 2006-3430 filed on Jan. 11, 2006.

FIELD OF THE INVENTION

The present invention relates to a fuel vapor treatment apparatus. The present invention further relates to a fuel vapor treatment system having the fuel vapor treatment apparatus. The present invention further relates to a method for operating the fuel vapor treatment system.

BACKGROUND OF THE INVENTION

A fuel vapor treatment apparatus directly purges fuel vapor, which is produced in a fuel tank, into an intake passage of an internal combustion engine. Alternatively, a fuel vapor treatment apparatus temporarily adsorbs fuel vapor to an adsorbent of a canister and then purges the adsorbed fuel vapor into the intake passage. In the fuel vapor treatment apparatus according to JP-A-H5-18326 or JP-A-H6-101534, a fuel vapor concentration in a mixture to be purged into the intake passage is measured as a fuel vapor state prior to the purge. Concretely, the flow rate or density of the mixture is detected in a purge passage through which the mixture is purged into the intake passage. In addition, the flow rate or density of air is detected in an atmospheric passage, which opens to the atmosphere.

The fuel vapor concentration is measured in accordance with the ratio between the detection results of the purge passage and the atmospheric passage. In the above structure, negative pressure in the intake passage is applied to each of the passages, and the mixture or air flows through the corresponding passage, whereby the flow rate or density is detected. When a pulsation occurs in negative pressure through the intake passage, the flow rate or density fluctuates, and the measurement accuracy of the fuel vapor concentration decreases. Besides, when negative pressure of the intake passage is small, the flow rate of the mixture or air in the corresponding passage decreases. Consequently, the detection of the flow rate or density becomes difficult.

Fuel vapor produced in the fuel tank may flow into a measurement passage separate from the purge passage, when the measurement passage is blocked from the intake passage. Here, the fuel vapor concentration is measured in such a way that a physical quantity such as pressure or flow rate correlating to the fuel vapor concentration is detected in the measurement passage. Accordingly, fuel vapor or air flows through the measurement passage irrespective of the fluctuation of negative pressure of the intake passage, and the fuel vapor concentration may be precisely measured.

Fuel vapor is purged into the intake passage on the basis of the measured fuel-vapor concentration. A quantity of fuel injected from a fuel injection valve is set in accordance with a quantity of fuel vapor, which is to be purged. In this regard, when a malfunction occurs in any of components for measuring the fuel vapor state, the measurement cannot be accurately performed. As a result, the quantity of fuel injection cannot be appropriately set, and consequently, an actual air/fuel ratio may deviate from a target air/fuel ratio.

SUMMARY OF THE INVENTION

The present invention addresses the above disadvantage.

According to one aspect of the present invention, a fuel vapor treatment apparatus connects with a fuel tank, which produces fuel vapor to be purged into an intake passage of an internal combustion engine through a purge passage. The fuel vapor treatment apparatus includes a state measuring unit that includes a measurement passage provided separately from the purge passage. When the measurement passage is blocked from the intake passage, the state measuring unit measures a state of fuel vapor by detecting a physical quantity of the fuel vapor in the measurement passage. The physical quantity is correlative to the state of fuel vapor. The fuel vapor treatment apparatus further includes a diagnosis unit for diagnosing a malfunction of at least one of components of the state measuring unit.

According to another aspect of the present invention, a fuel vapor treatment system is used for an internal combustion engine connecting with a fuel tank. The internal combustion engine draws air through an intake passage. The fuel vapor treatment system includes a fuel vapor treatment apparatus that includes a purge passage through which fuel vapor produced in the fuel tank is purged into the intake passage. The fuel vapor treatment apparatus further includes a measurement passage through which fuel vapor flows from the fuel tank. The fuel vapor treatment apparatus further includes a sensing unit for detecting a state of the fuel vapor in the measurement passage when the measurement passage is blocked from the intake passage. The sensing unit diagnoses a malfunction of the fuel vapor treatment apparatus in accordance with the state of the fuel vapor.

According to another aspect of the present invention, a method is used for operating a fuel vapor treatment system, which includes a fuel vapor treatment apparatus for purging fuel vapor produced in a fuel tank into an intake passage of an internal combustion engine through a purge passage. The method includes introducing fuel vapor from the fuel tank into a measurement passage in a condition where the measurement passage is blocked from the intake passage. The method further includes measuring a state of the fuel vapor in the measurement passage by detecting a physical quantity correlative to the state of fuel vapor. The method further includes diagnosing a malfunction of at least one of components constructing the fuel vapor treatment apparatus in accordance with the state of fuel vapor.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
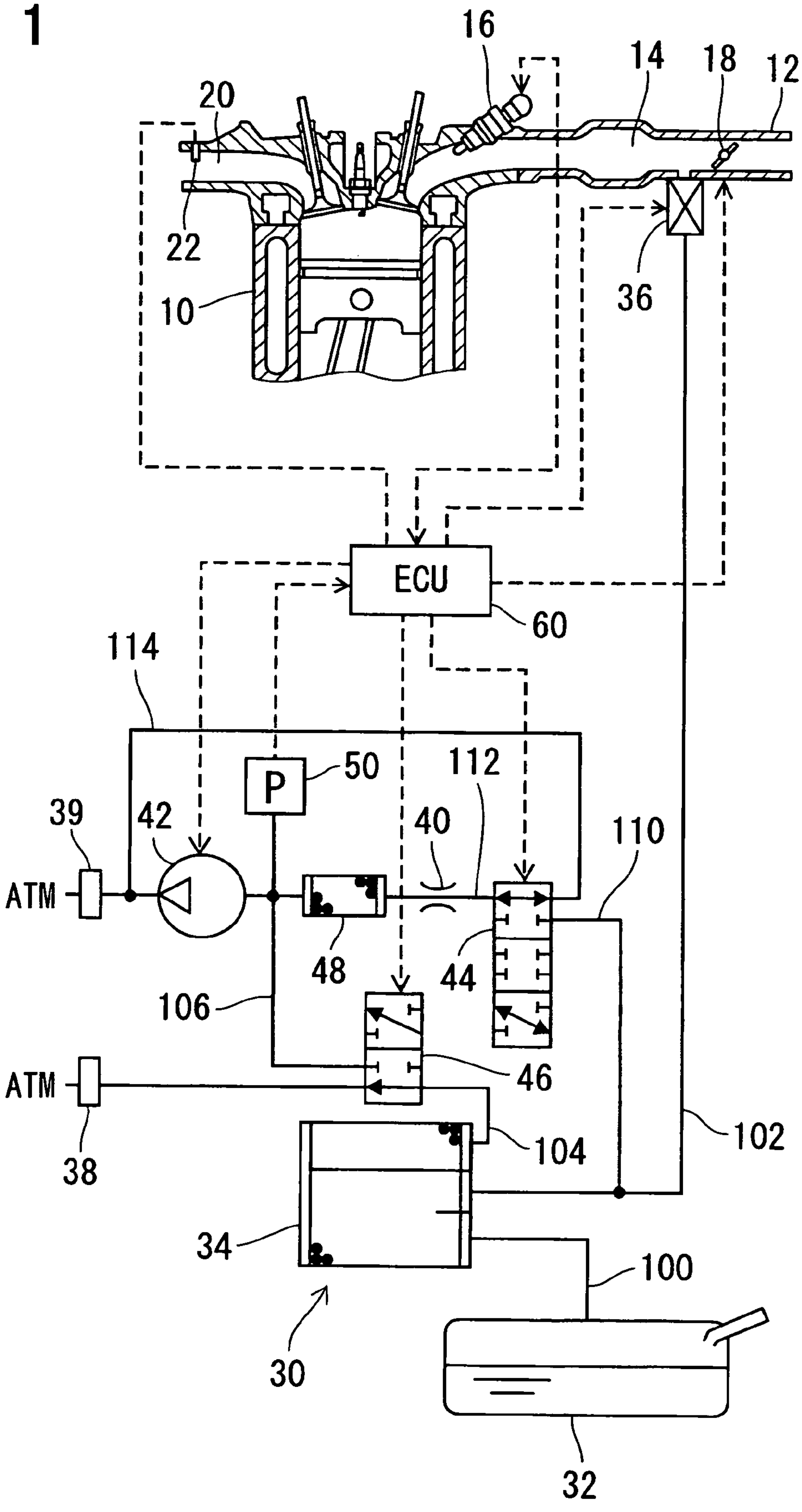
FIG. 1 is a schematic view showing a fuel vapor treatment apparatus according to a first embodiment.

In an example shown in FIG. 1, a fuel vapor treatment apparatus 30 is provided to an internal combustion engine 10 of a vehicle. The engine 10 may be a gasoline engine, which generates power by combusting gasoline accommodated in a fuel tank 32. A fuel injection valve 16 for controlling a fuel injection quantity, a throttle valve 18 for controlling a flow rate of intake air, and the like are provided in an intake passage 14 of the engine 10. An air/fuel ratio sensor 22 for detecting an air/fuel ratio, and the like are provided in the exhaust passage 20

Next, an operation of the fuel vapor treatment apparatus 30 is described. Fuel vapor is produced in the fuel tank 32, and the fuel vapor is once adsorbed to a first canister 34. The fuel vapor adsorbed to the first canister 34 is purged into the intake passage 14. The fuel tank 32 connects with the first canister 34 through a passage 100. Fuel vapor, which is produced in the fuel tank 32, passes through the passage 100, and the fuel vapor is adsorbed to an adsorbent such as an activated charcoal in the first canister 34. When a purge valve 36 communicates therein, fuel vapor adsorbed to the first canister 34 passes through a purge passage 102, so that the fuel vapor is drawn by negative pressure in the intake passage 14, and is purged into the intake passage 14 the downstream of the throttle valve 18. In a state shown in FIG. 1, the first canister 34 communicates with the atmosphere through a passage 104, a solenoid valve 46, and a filter 38. The first canister 34 connects with a solenoid valve 44 through a passage 110, which communicates with the purge passage 102.

The fuel vapor treatment apparatus 30 detects a fuel vapor state indicated by a fuel vapor concentration in a mixture of air and fuel vapor, which is purged into the intake passage 14. The fuel vapor treatment apparatus 30 controls the purge valve 36, thereby controlling a fuel vapor quantity to be purged into the intake passage 14, so that the fuel vapor treatment apparatus 30 controls the fuel injection quantity of the fuel injection valve 16 in accordance with the measured fuel-vapor concentration.

A state measuring unit measures the concentration of fuel vapor, which is purged from the first canister 34 into the intake passage 14 through the purge valve 36. The state measuring unit includes a pump 42, the solenoid valve 44, a pressure sensor 50, a control unit (ECU) 60, and a measurement passage 112. The ECU 60 serves as a concentration calculating unit, a diagnosis unit, and a leak check unit. The ECU 60 controls the fuel injection valve 16, the throttle valve 18, the purge valve 36, the pump 42, and solenoid valves 44 and 46.

A throttle 40 is provided in the measurement passage 112. The solenoid valve 44 is provided in the measurement passage 112 connecting with the throttle 40. The solenoid valve 44 serves as a first switching valve.

A second canister 48, the pump 42, and a filter 39 are provided in the measurement passage 112 on the opposite side of the solenoid valve 44 with respect to the throttle 40. The second canister 48, the pump 42, and the filter 39 are arranged in this order from the throttle 40. A passage 114 connects part of the measurement passage 112, which is located between the pump 42 and the filter 39, with the solenoid valve 44 on the opposite side of the throttle 40. One end of the passage 114 opens to the atmosphere through the filter 39.

The solenoid valve 44 operates to switch one of three positions including communication between the throttle 40 and the passage 114, communication between the throttle 40 and the passage 110, and blockade between the throttle 40 and both the passages 110 and 114, for example. When electricity supply to the solenoid valve 44 is terminated, the solenoid valve 44 maintains the throttle 40 and the passage 114 in communication, so that and the solenoid valve 44 communicate the throttle 40 with the atmosphere through the passage 114, for example. The solenoid valve 46 serves as a second switching valve.

As shown in FIG. 1, when electricity supply to the solenoid valve 46 is terminated, the solenoid valve 46 communicates the passage 104 with the atmosphere through the filter 38, so that the first canister 34 communicates with the atmosphere through the passage 104 and the solenoid valve 46.

In this condition, when the purge valve 36 communicates therein in this state, fuel vapor adsorbed to the first canister 34 is purged to the downstream of the throttle valve 18 through the purge passage 102 by negative pressure in the intake passage 14. When the fuel vapor treatment apparatus 30 is in a leak check mode, the solenoid valve 46 is supplied with electricity to communicate a passage 106 with the passage 104, thereby communicating the pump 42 with the first canister 34. The passage 106 communicates with part of the measurement passage 112 between the pump 42 and the second canister 48. When the passages 106 communicate with the passage 104, the pump 42 operates to reduce pressure in the first canister 34 and the passages in the fuel vapor treatment apparatus 30, so that a leak check operation is performed. The pump 42 serves as a flow generating unit. The pump 42 also serves as a pressure generating unit.

The second canister 48 is provided in the measurement passage 112 between the throttle 40 and the pump 42. Likewise to the first canister 34, the second canister 48 accommodates an adsorbent such as an activated charcoal therein.

When the solenoid valve 44 communicates the measurement passage 112 with the passage 110, the pump 42 operates to reduce pressure through the measurement passage 112, so that fuel vapor adsorbed to the first canister 34 is drawn into the measurement passage 112. Thus, the mixture including air and fuel vapor flows into the second canister 48 after passing through the throttle 40, so that the second canister 48 adsorbs fuel vapor, thereby removing the fuel vapor from the mixture.

In this fuel vapor treatment apparatus 30, the second canister 48 is provided between the pump 42 and the throttle 40 so as to remove fuel vapor from the mixture after passing through the throttle 40. When the mixture including air and fuel vapor passes through the throttle 40, the detection pressure in this structure is greater than the detection pressure in a structure where the second canister 48 is not provided. Therefore, the air pressure $P_{AIR}$, when the air passes through the throttle 40, and the mixture pressure $P_{GAS}$, when the mixture including air and fuel vapor passes through the throttle 40, have a greater differential value therebetween by providing the second canister 48 between the pump 42 and the throttle 40. Accordingly, a sufficiently large detection gain G can be ensured for the pressure resolution of the pressure sensor 50, and the relative detection accuracy of the mixture pressure $P_{GAS}$ to the air pressure $P_{AIR}$, in turn, the measurement accuracy of the fuel vapor concentration is enhanced.

The pressure sensor 50 connects with the part of the measurement passage 112 between the pump 42 and the second canister 48. This pressure sensor 50 is, for example, a differential pressure sensor, which detects the differential pressure between the atmospheric pressure and pressure in the measurement passage 112 in the passage between the pump 42 and the second canister 48. That is, the pressure sensor 50 detects the differential pressure in the passage between the pump 42 and the throttle 40; The pressure sensor 50 serves as a pressure detecting unit.

The detection pressure, which the pressure sensor 50 detects during the operation of the pump 42, is substantially equal to differential pressure across the throttle 40, when the solenoid valve 44 maintains the throttle 40 in communication with the atmosphere. When the solenoid valve 44 blocks the throttle 40 from both the passages 110 and 114, the measurement passage 112 is closed on the suction side of the pump 42. The detection pressure of the pressure sensor 50 during the operation of the pump 42 becomes substantially equal to the cutoff pressure of the pump 42.

Figure 10:
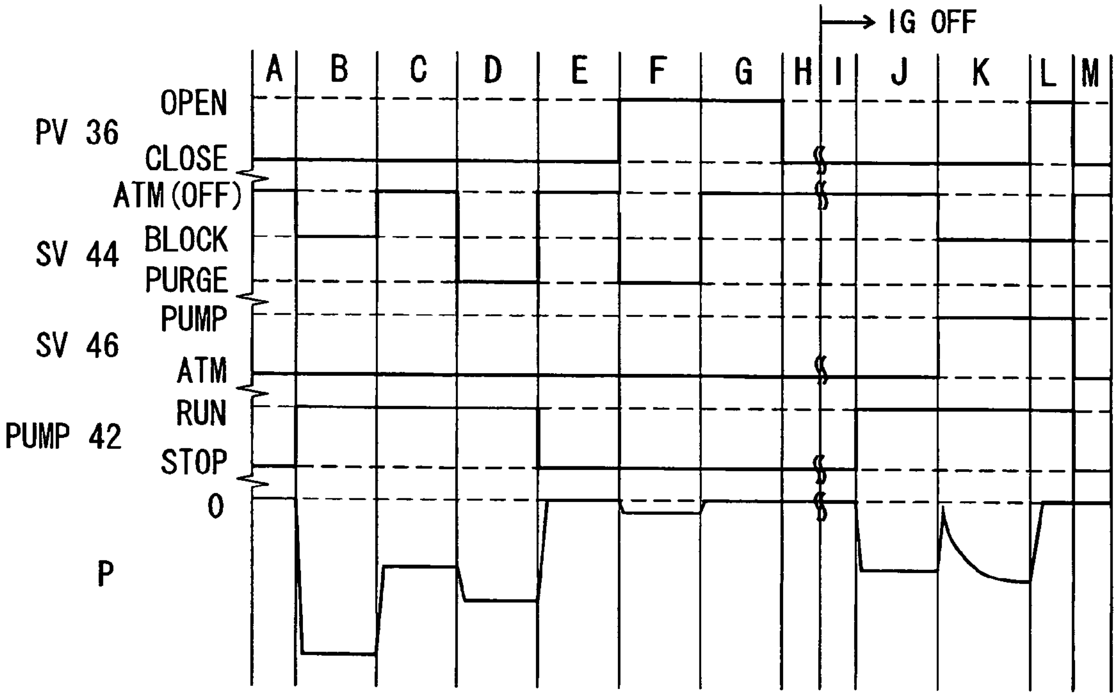
FIG. 10 is a time chart showing an operation of the fuel treatment apparatus.

As shown in FIG. 10, the time chart successively indicates the respective stages of standby (A), the measurement of the fuel vapor concentration (B-E), the purge of fuel vapor (F-G), and the leak check operation (J-L) after the turn-ON of an ignition key. The fuel vapor concentration measurement, the purge, the leak check operation, and a malfunction diagnosis, described below, are processed in such a way that the ECU 60 executes control programs stored in a ROM, an EEPROM, and the like of the ECU 60. When the ECU 60 determines any of the components for measuring the fuel vapor concentration to malfunction, the measurement of the fuel vapor concentration and the diagnostic process are desirably stopped, the purge valve (PV) 36 is desirably closed, and purge of fuel vapor into the intake passage 14 is desirably stopped. When the purge of fuel vapor is stopped, the injection quantity of the fuel injection valve 16 may be adjusted to produce the target air/fuel ratio on the basis of an actual air/fuel ratio detected by the air/fuel ratio sensor 22. The causes of malfunctions in the following diagnostic process are examples.

Figure 11:
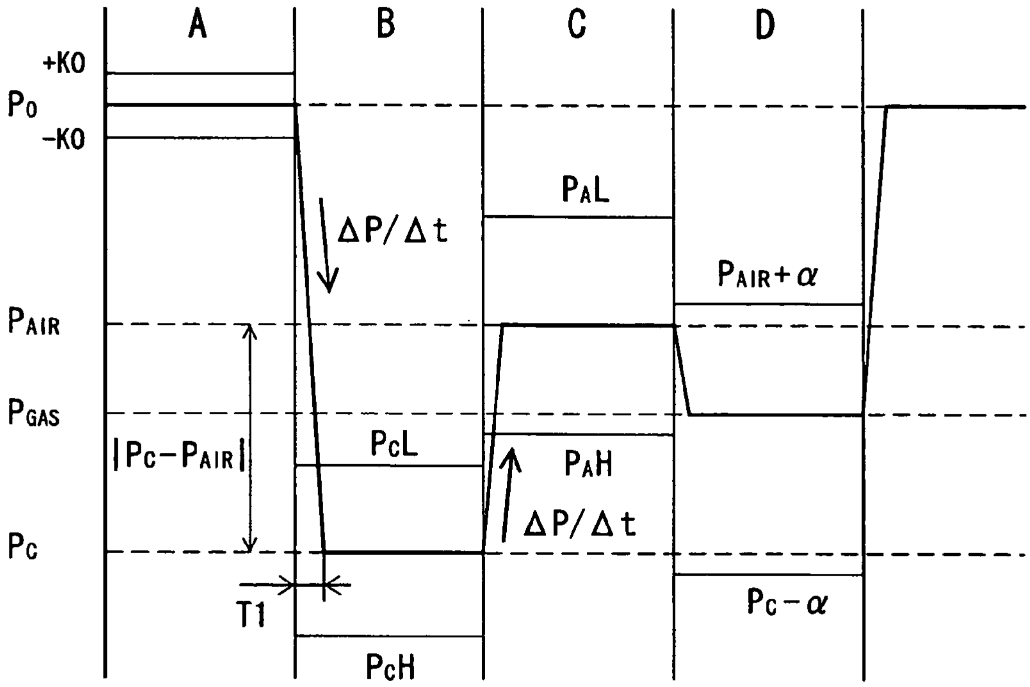
FIG. 11 is a time chart showing an operation for measuring a fuel vapor concentration in the fuel vapor treatment apparatus.

The stage A in FIGS. 10 and 11 is immediately after the start of the engine 10 since the turn-ON of the ignition key. At the stage A, the pump 42 is stopped, and the solenoid valves 44 and 46 (SV 44, 46) are in the state shown in FIG. 1, so that the measurement passage 112 communicates with the atmosphere. In this state, the output of the pressure sensor 50 is diagnosed. When an output voltage of the pressure sensor 50 is outside a range in the normal operation of this pressure sensor 50, it is determined that the pressure sensor 50 is disconnected or short-circuited. In this state, the malfunction of the fuel vapor treatment apparatus is notified to the driver of the vehicle by, for example, lighting up a warning lamp or producing a warning sound. In order to notify the malfunction portion, a malfunction flag may be set in a memory such as the EEPROM of the ECU 60 so as to turn ON the set the malfunction flag of the pressure sensor 50.

When the voltage of the pressure sensor 50 is within the normal range, so that a pressure P indicated by the voltage of the pressure sensor 50 is in $P_0-K0 \leqq P \leqq P_0+K0$ with respect to the atmospheric pressure $P_0$, the pressure sensor 50 is determined to be normal. Alternatively, when the pressure P is not in $P_0-K0 \leqq P \leqq P_0+K0$, the pressure sensor 50 is determined to malfunction. When the pressure sensor 50 is determined to be normal at the stage A, the pressure sensor 50 is assumed to be normal in the following diagnosis.

When the pressure P indicated by the pressure sensor 50 is low where $P<P_AL$, it is determined that the pressure P is reduced due to operating the pump 42 even supplying electricity to the pump 42 is terminated. In this situation, the malfunction is caused since the pump 42 is improperly in its ON state.

The stage A is in the standby state. At the stage A, when the engine speed exceeds several hundred rpm, or water temperature exceeds a predetermined temperature, for example, it is determined that the condition for detecting fuel vapor concentration is satisfied. When the ambient temperature of the fuel tank 32 is low, fuel vapor is hardly produced in the fuel tank 32. Except immediately after the start, the condition for detecting fuel vapor concentration may be satisfied when the ambient temperature of the fuel tank 32 increases such that fuel vapor is produced in the fuel tank. When the condition for detecting fuel vapor concentration is satisfied, the stage A shifts to the stage B, at which the fuel vapor concentration is measured.

Figure 2:
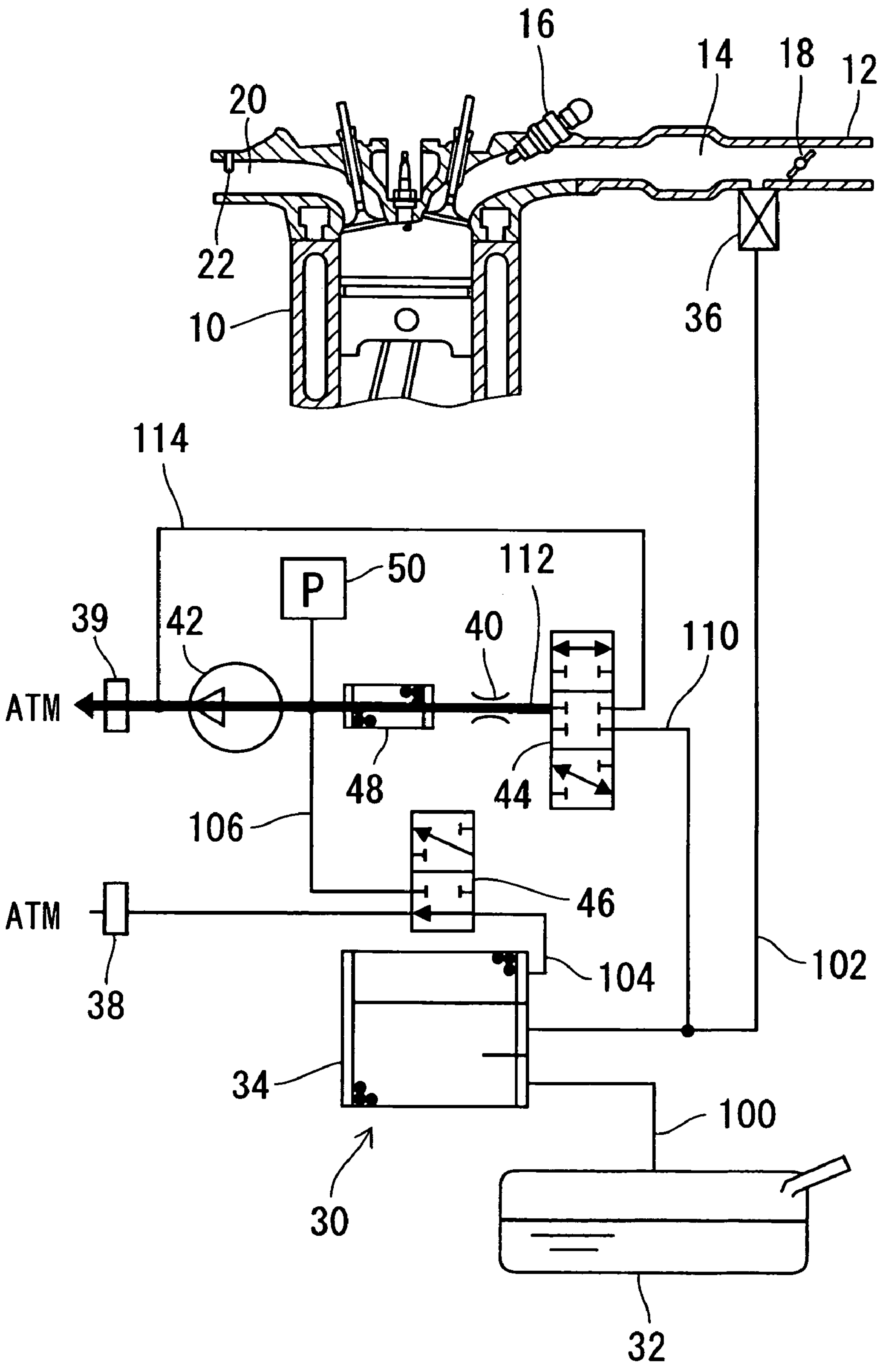
FIG. 2 is a schematic view showing a flow passage when cutoff pressure of a pump is detected in the fuel vapor treatment apparatus.

At the stage B in FIGS. 10 and 11, the solenoid valve 44 is operated to be in the state shown in FIG. 2, thereby blocking the throttle 40 from both the passages 110 and 114, and the pump 42 is operated. In this state, the suction side of the pump 42 is blocked via the throttle 40, so that the pressure sensor 50 detects the cutoff pressure $P_C$ of the pump 42. When the pressure P indicated by the pressure sensor 50 is in $P_CH \leqq P \leqq P_CL$ with respect to the predetermined cutoff pressure $P_C$, the pressure sensor 50 is determined to be normal. When the pressure P corresponds to $P \leqq P_CL$, the pressure sensor 50 may be determined normal. The $P_CH$ is on the side of negative in pressure with respect to the $P_CL$. That is, the $P_CH$ is less than the $P_CL$ in absolute pressure.

When $P_0-K0 \leqq P \leqq P_0+K0$ is satisfied, it is determined that the pressure does not change since the stage A. That is, the situation is determined to malfunction in which the pump 42 is not operated even though being supplied with electricity. When the pressure P is not in $P_CH \leqq P \leqq P_CL$, the pump 42 is determined to malfunction. Alternatively, when the pressure P is not in $P_CH \leqq P \leqq P_CL$ but is around the predetermined air pressure $P_{AIR}$, it is determined that the throttle 40 communicates with the atmosphere through the passage 114, even though the solenoid valve 44 is operated from the stage A shown in FIG. 1 to the state shown in FIG. 2. In this case, the solenoid valve 44 may be determined to malfunction.

When the absolute value of a pressure decreasing rate $\Delta P/\Delta t$ the shift from the stage A to the stage B is small, or where a period T1 in which pressure P reaches the cutoff pressure $P_C$ is longer than a predetermined period, it may be determined to malfunction. In this case, the suction performance of the pump 42 may be insufficient, or the passage 106 may partly communicate with the atmosphere due to incompletely blockade of the solenoid valve 46. That is, at least one of the pump 42 and the solenoid valve 46 is determined to malfunction.

When any malfunction is not caused at the stage B where the cutoff pressure $P_C$ is detected, the stage B shifts to the next stage C at which air pressure is detected. Specifically, the pump 42 is operated, and the solenoid valves 44 and 46 are operated to be in the state shown in FIG. 3, in which only air flows through the throttle 40. The pressure sensor 50 detects the air pressure $P_{AIR}$. When the pressure P indicated by the pressure sensor 50 is in $P_AH \leqq P \leqq P_AL$ with respect to the predetermined air pressure $P_{AIR}$, the pressure is determined to be normal.

When $P>P_AL$ is satisfied, the pressure P is determined to be excessively high. In this case, the cause of the malfunction is determined that the choking diameter in the throttle 40 becomes large, alternatively, the suction performance of the pump 42 is insufficient, alternatively, the passage 106 is not properly blocked by the solenoid valve 46. That is, at least one of the throttle 40, the pump 42, and the solenoid valve 46 is determined to malfunction.

When $P<P_AH$ is satisfied, the pressure P is excessively low. In this case, the cause of the malfunction is determined that the choking diameter of the throttle 40 becomes small, alternatively, the solenoid valve 44 does not communicate the measurement passage 112 with the passage 114 even though being operated. That is, at least either of the throttle 40 and the solenoid valve 44 is determined to malfunction.

Figure 3:
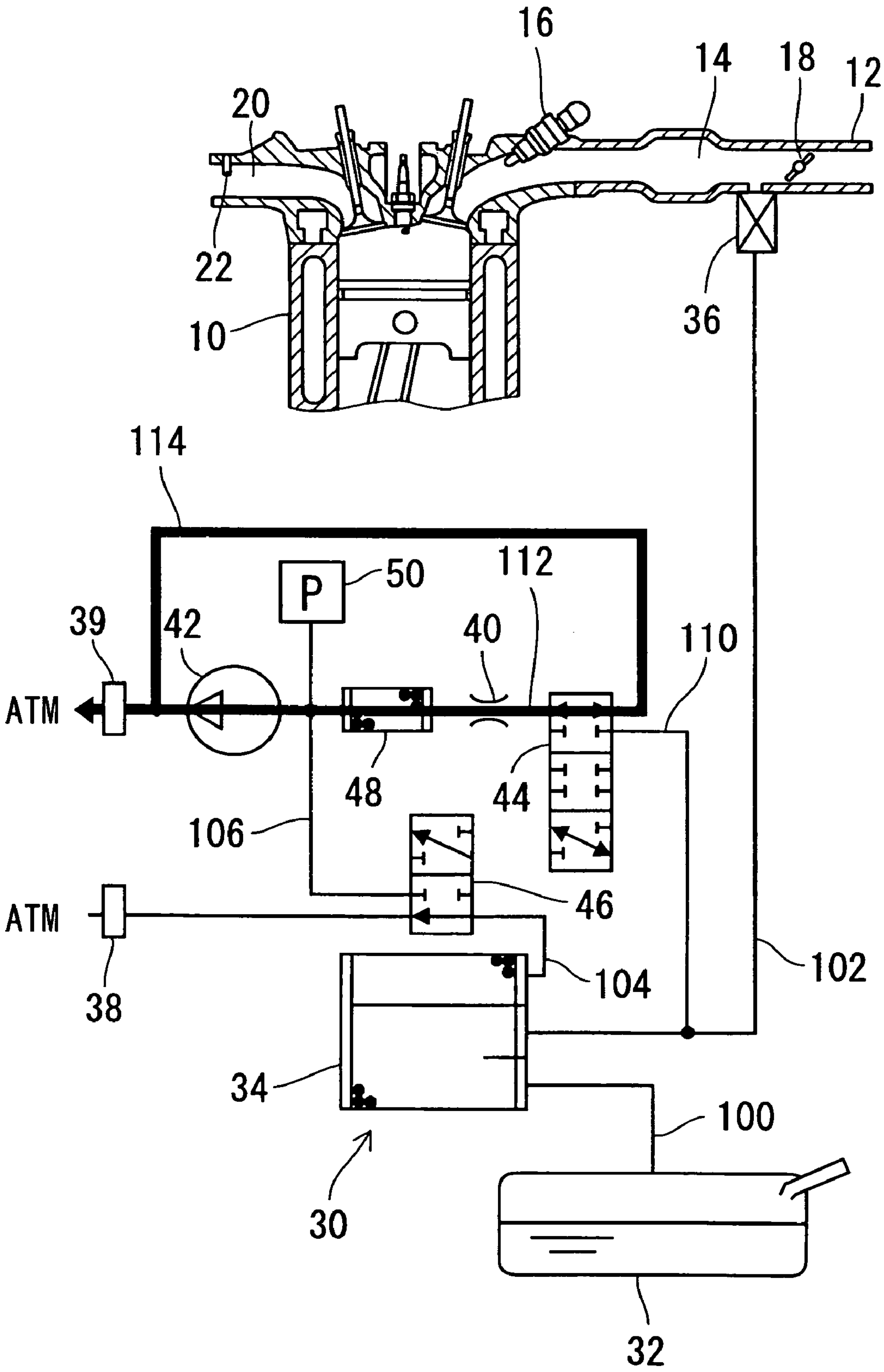
FIG. 3 is a schematic view showing a flow passage when air pressure is detected in the fuel vapor treatment apparatus.

When a differential pressure $|P_C-P_{AIR}|$ at the shift from the stage B to the stage C is excessively small, it is determined to be abnormal that the solenoid valve 44 is not properly operated from the state shown in FIG. 2 to the state shown in FIG. 3.

As shown in FIG. 11, when the absolute value of a pressure increasing rate $\Delta P/\Delta t$ the shift from the stage B to the stage C is small, or where the pressure P reaches the air pressure $P_{AIR}$ is longer than a predetermined period, it is determined to be malfunction. In this case, the suction performance of the pump 42 is not sufficient, alternatively the throttle 40 does not properly communicate with the passage 114 through the solenoid valve 44. That is, at least one of the pump 42 and the solenoid valve 44 is determined to malfunction.

When any malfunction is not caused at the stage C where the air pressure $P_{AIR}$ is detected, the stage C shifts to the next stage D at which the pressure of the mixture is detected.

Figure 4:
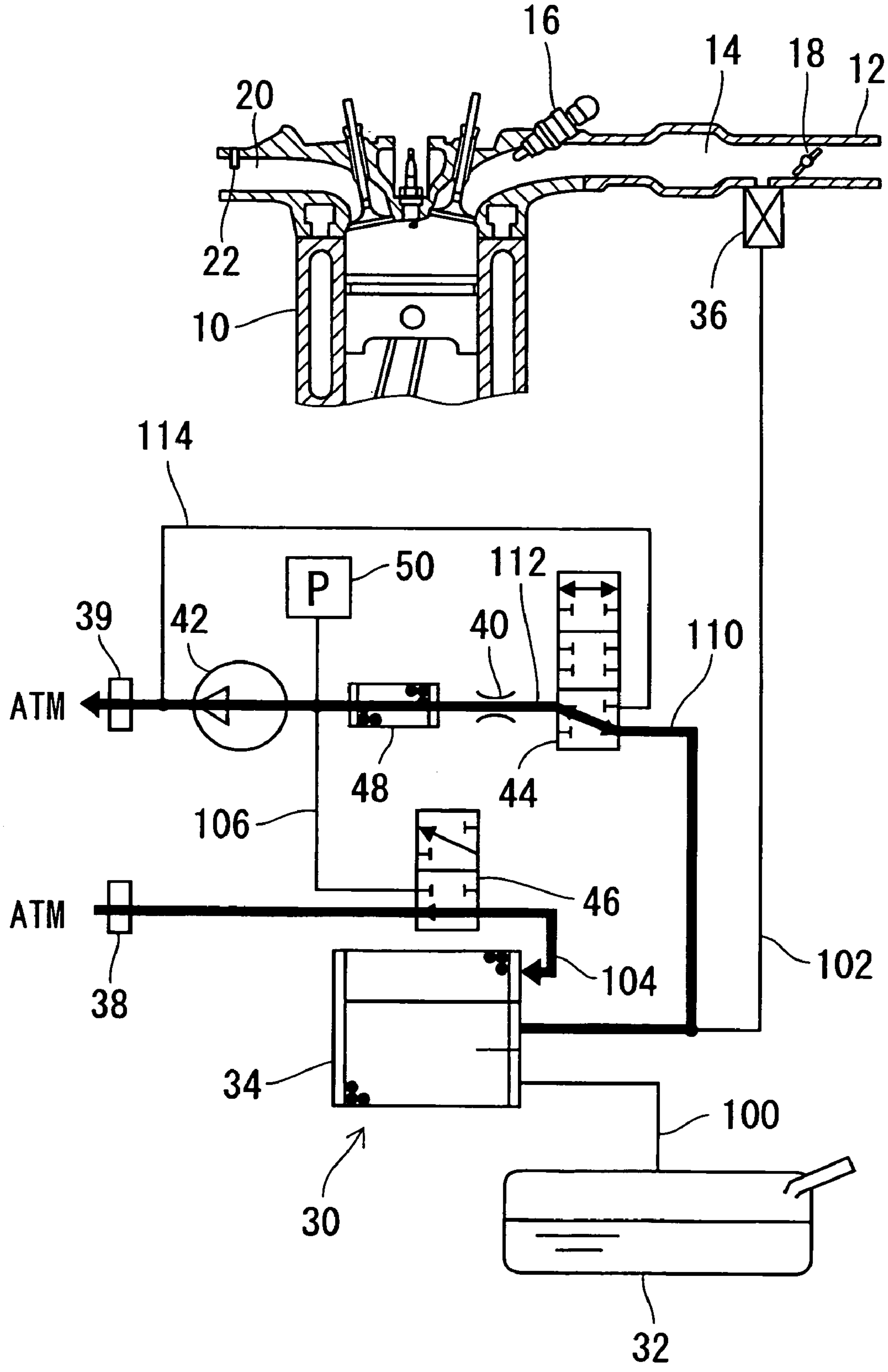
FIG. 4 is a schematic view showing a flow passage when pressure of mixture including air and fuel vapor is detected in the fuel vapor treatment apparatus.

At the stage D, the pump 42 is operated, and the solenoid valves 44 and 46 are operated to be in the state shown in FIG. 4, so that the mixture including air and fuel vapor flows through the throttle 40. In this state, the pressure sensor 50 detects the mixture pressure $P_{GAS}$. When the pressure P indicated by the pressure sensor 50 lies in $P_C-\alpha<P<P_{AIR}+\alpha$, it is determined to be normal.

When $P>P_{AIR}+\alpha$ or $P_C-\alpha>P$ is satisfied, it is determined that at least one component in the passages of thick solid lines depicted in FIG. 4 such as the solenoid valves 44 and 46, the throttle 40 the pump 42 is malfunction.

When any malfunction is not detected at the above stages A-D, the ECU 60 calculates the fuel vapor concentration in accordance with the cutoff pressure $P_C$, the air pressure $P_{AIR}$, and the mixture pressure $P_{GAS}$. Subsequently, the opening defined in the purge valve (PV) 36 and the fuel injection quantity of the fuel injection valve 16 are set so as to produce the target air/fuel ratio. The cutoff pressure $P_C$, the air pressure $P_{AIR}$ and the mixture pressure $P_{GAS}$ correspond to physical quantities.

Figure 12:
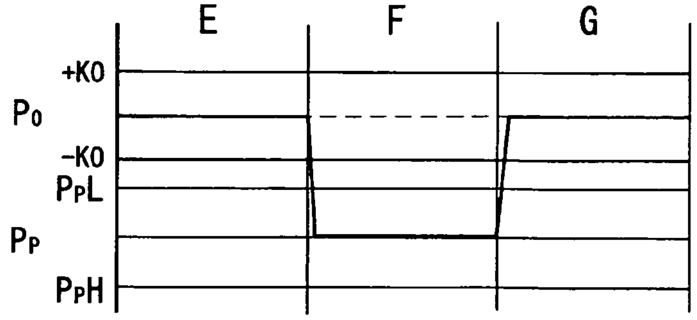
FIG. 12 is a time chart showing an operation for purging mixture in the fuel vapor treatment apparatus.

When the fuel vapor concentration is normally measured and where the purge condition is satisfied, as shown in FIGS. 10 and 12, the stage E waiting for the purge is shifted to the stages F and G executing the purge. At the stages F and G, fuel vapor adsorbed to the first canister 34 is purged into the intake passage 14.

Figure 5:
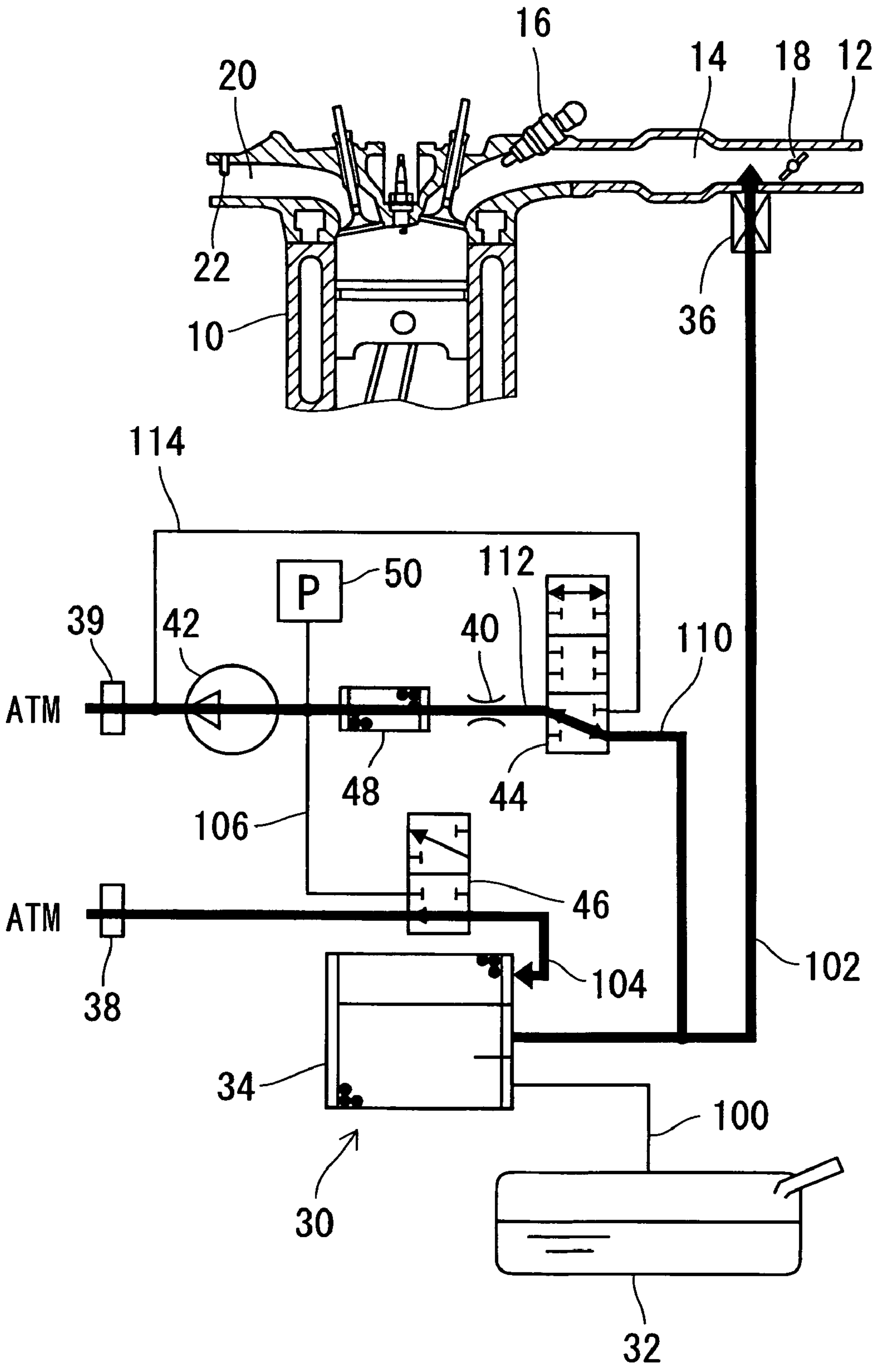
FIG. 5 is a schematic view showing a flow passage when mixture is purged from both first and second canisters in the fuel vapor treatment apparatus.

At the stage F, the pump 42 stops, the purge valve 36 opens to communicate therein, and the solenoid valves 44 and 46 are operated to be in the states shown in FIG. 5. In this condition, fuel vapor is purged from both the first canister 34 and the second canister 48. When, at the stage F, the pressure P of the pressure sensor 50 is reduced by negative pressure in the intake passage 14, so that $P_PH \leqq P \leqq P_PL$ is satisfied, it is determined to be normal.

When $P>P_PL$ is satisfied, it is determined to be malfunction that pressure in the measurement passage 112 is not properly reduced. The cause of this malfunction is, for example, that the purge valve 36 may not be opened even though being supplied with electricity, or that the solenoid valve 44 does not communicate the throttle 40 with the passage 110.

When $P<P_PH$ is satisfied, it is determined to be malfunction that the pressure P of the pressure sensor 50 improperly decreases since the solenoid valve 46 does not block the first canister 34 from the pump 42.

When the output of the air/fuel ratio sensor 22 indicates a value on a rich side beyond the predetermined range of the target air/fuel ratio during the purge, it is determined that at least one of the components including the air/fuel ratio sensor 22 and the fuel injection valve 16 to malfunction.

Figure 6:
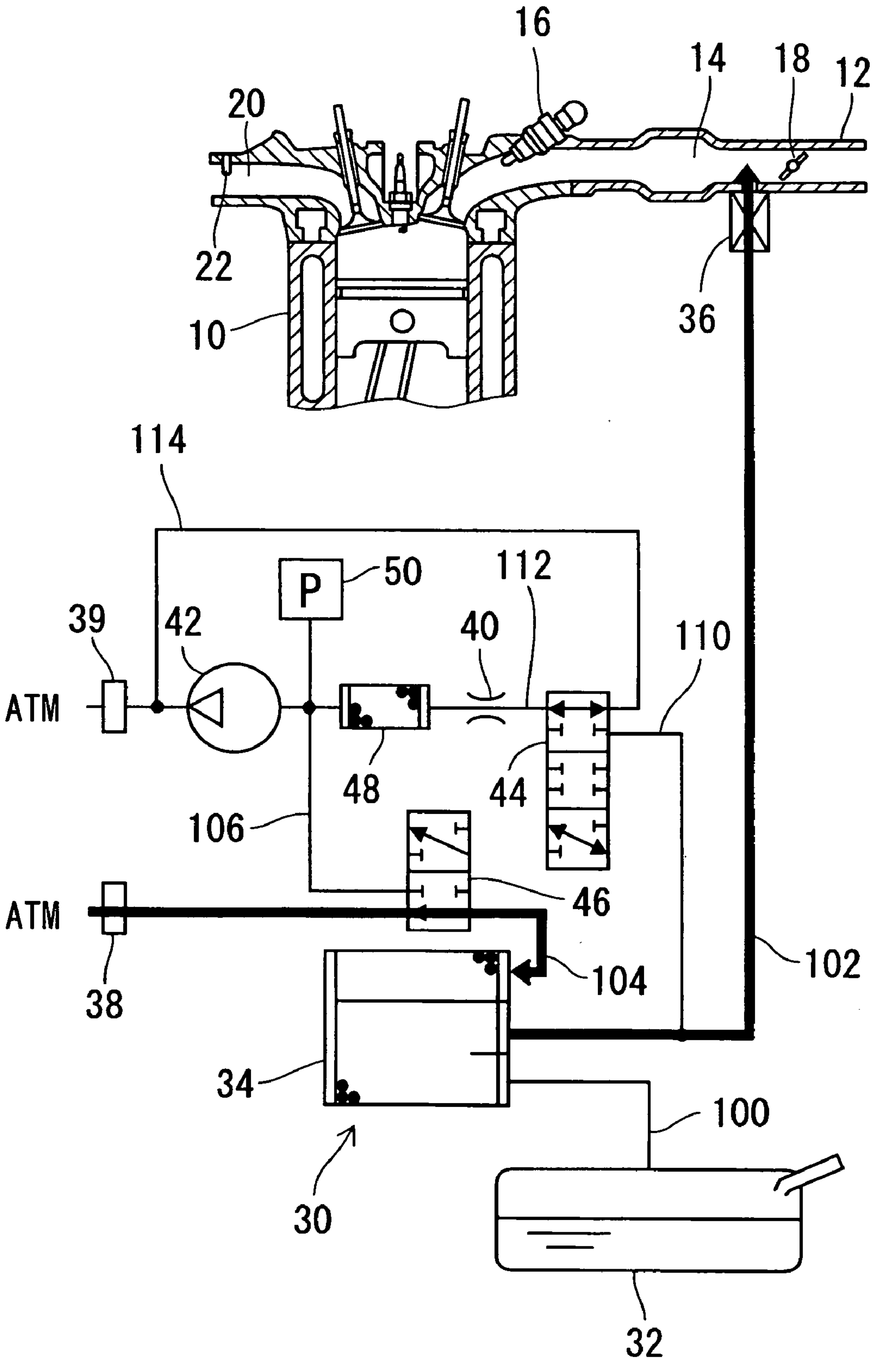
FIG. 6 is a schematic view showing a flow passage when mixture is purged from the first canister in the fuel vapor treatment apparatus.

In an operation where fuel vapor is purged from only the first canister 34, the pump 42 stops, and the purge valve 36 opens to communicate therein, and the solenoid valves 44 and 46 are operated to be in the states shown in FIG. 6. The purge process here is the same as the process of a fuel vapor treatment apparatus, which does not use the second canister 48. As shown in FIG. 6, at the stage G, the measurement passage 112 opens to the atmosphere. Therefore, when $P_0-K0 \leqq P \leqq P_0+K0$ is satisfied, it is determined to be normal. When $P<P_0-K0$ is satisfied, it is determined to malfunction that the throttle 40 communicates with the purge passage 102 through the solenoid valve 44, or that the passages 104 and 106 communicate with each other through the solenoid valve 46.

Figure 13:
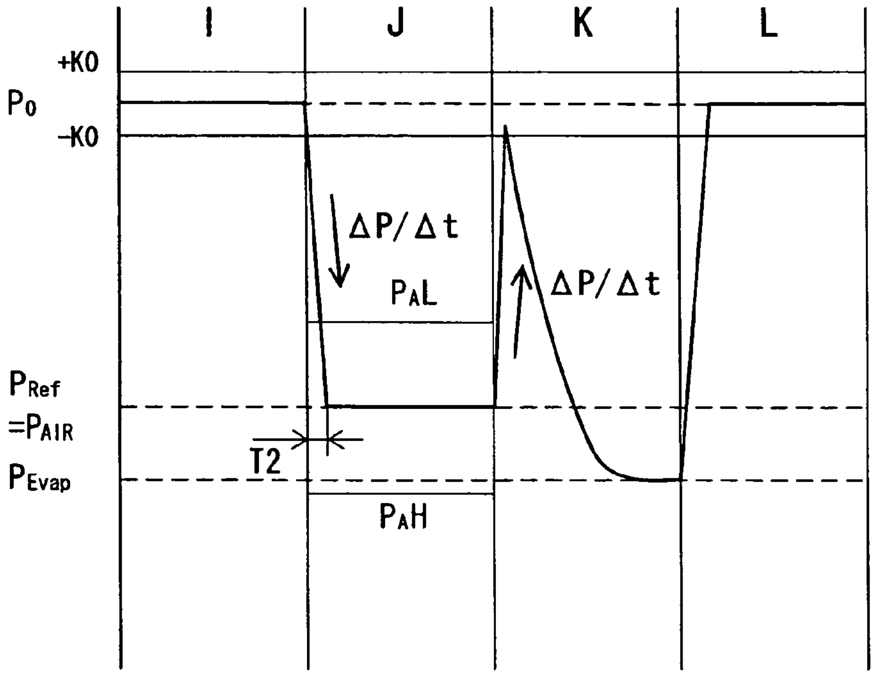
FIG. 13 is a time chart showing the leak check operation in the fuel vapor treatment apparatus.

When the leak check condition is satisfied, the ECU 60 executes the leak check operation after the turn-OFF of the ignition key. First, as shown in FIGS. 10 and 13, a reference pressure $P_{Ref}$ is detected at the stage J. At the stage J, the pump 42 is operated, and the solenoid valves 44 and 46 are in the states shown in FIG. 7, so that only air flows through the throttle 40. The connection among the passages in the stage J is the same as the connection in the stage C refer to FIG. 3, in which the air pressure $P_{AIR}$ is detected for the fuel vapor concentration measurement. The diagnosis operation in the stage J is the same as the diagnosis operation in the stage C.

Figure 8:
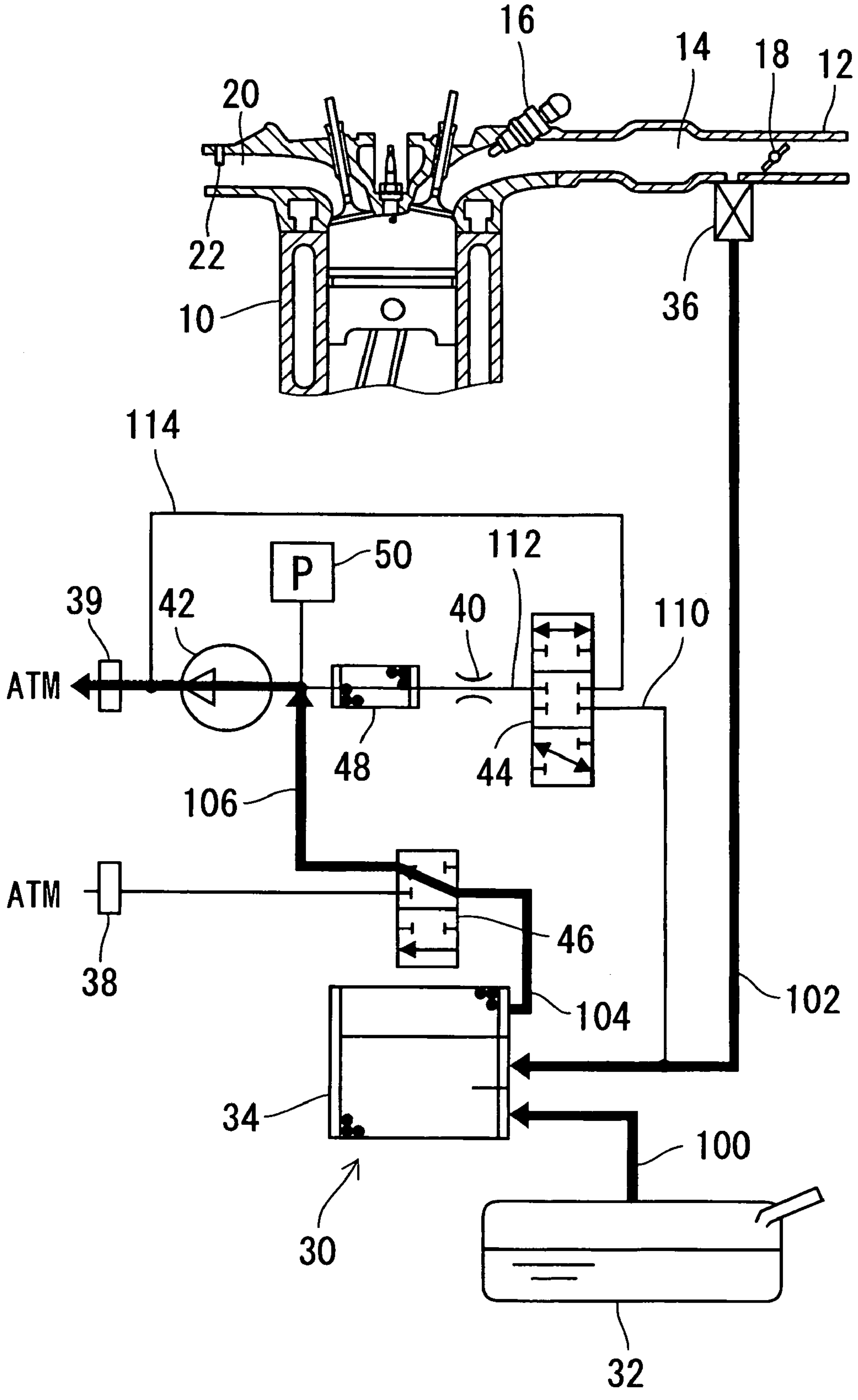
FIG. 8 is a schematic view showing a flow passage when a leak check operation is performed and a purge valve blocks therein, in the fuel vapor treatment apparatus.

When any malfunction is not caused at the stage J, the internal pressure check of the fuel vapor treatment apparatus 30 including the fuel tank 32 is performed at the next stage K. As shown in FIG. 8, at the stage K in FIGS. 10 and 13, the purge valve 36 closes to block therein, the pump 42 is operated, and the solenoid valves 44 and 46 are in the states in FIG. 8.

When the pressure P indicated by the pressure sensor 50 does not change even supplying electricity to the pump 42, the pump 42 is determined to malfunction.

When the pressure P changes, but where the pressure P is higher than the reference pressure $P_{Ref}$ and is close to the atmospheric pressure, the situation is determined to malfunction. In this condition, a hole, which is larger in diameter than the throttle 40, may open in the fuel vapor treatment apparatus 30 including the fuel tank 32, or any of the components of the fuel vapor treatment apparatus 30 for performing the leak check operation may malfunction. In this case, the malfunction may be, for example, at least one of that the suction performance of the pump 42 is insufficient, that the solenoid valve 46 sticks in an intermediate position therein, that the passage 106 communicates with the atmosphere through the throttle 40, and that the solenoid valve 46 leaks.

Figure 7:
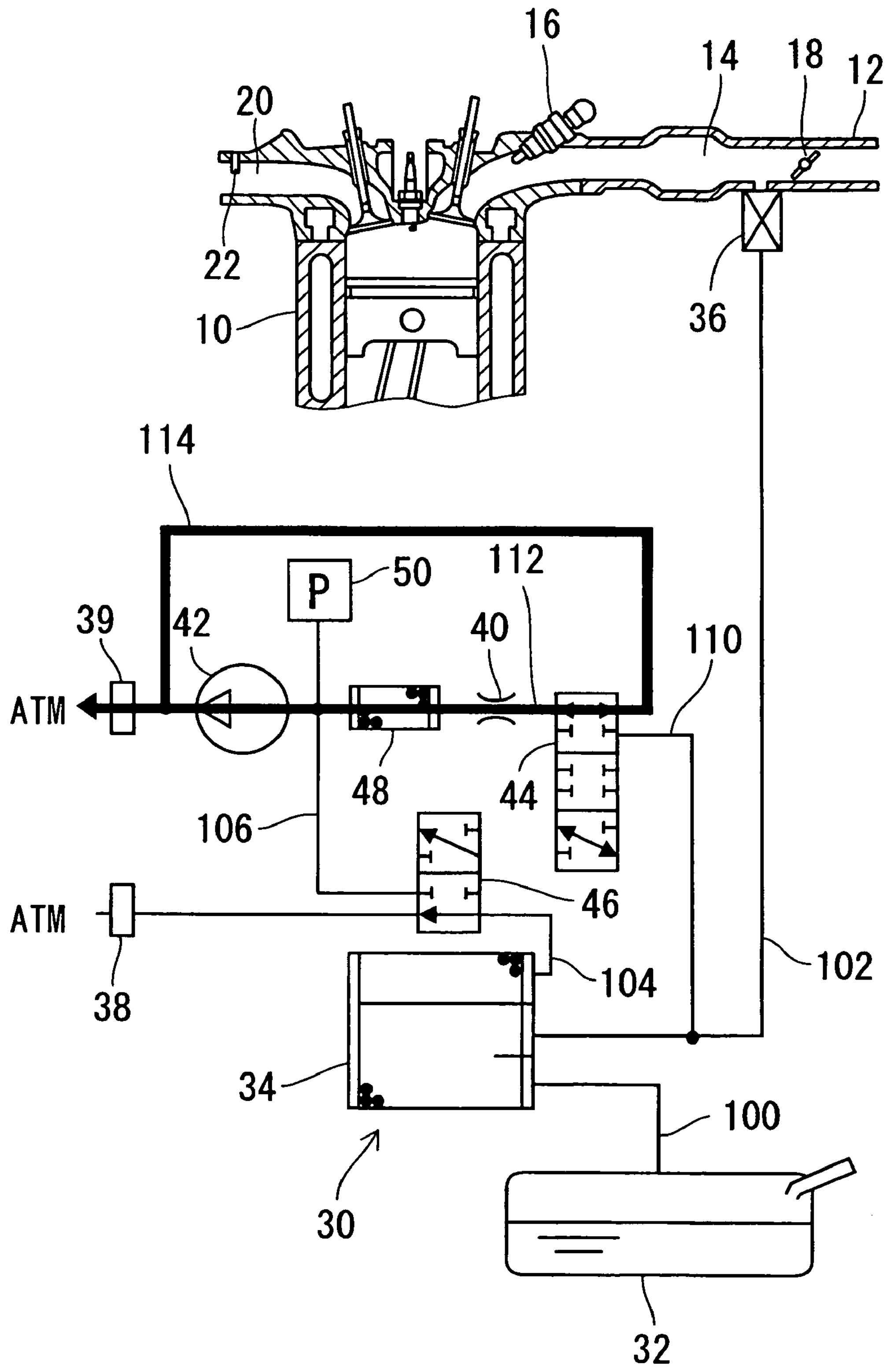
FIG. 7 is a schematic view showing a flow passage when reference pressure is detected in the fuel vapor treatment apparatus.

When the pressure P decreases to the reference pressure $P_{Ref}$ in a short time in the same manner as at the stage J, it is determined that the solenoid valve 46 remains in the state of FIG. 7, even though being supplied with electricity. That is, the solenoid valve 46 is determined to malfunction.

When any malfunction is not caused at the stage K, an malfunction of the purge valve 36 is diagnosed at the next stage L shown in FIGS. 10 and 13.

Figure 9:
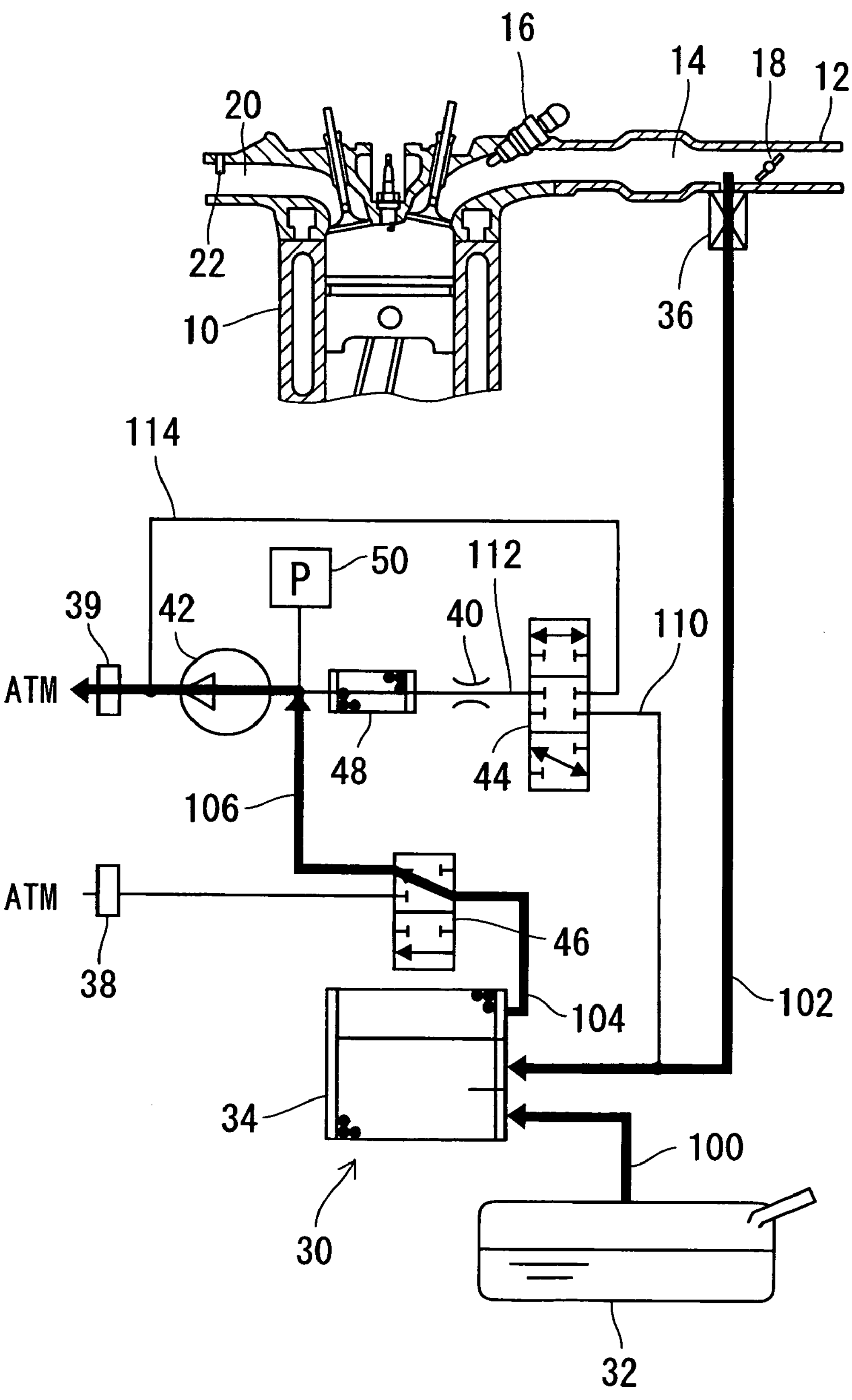
FIG. 9 is a schematic view showing a flow passage when the leak check operation is performed and the purge valve communicates therein, in the fuel vapor treatment apparatus.

As shown in FIG. 9, the purge valve 36 is supplied with electricity, thereby opening to communicate therein, so that the stage K shown in FIG. 8 shifts to stage L shown in FIG. 9. When the purge valve 36 normally communicates therein, the purge passage 102 communicates with the intake passage 14, so that the pressure P of the pressure sensor 50 increases to around the atmospheric pressure $P_0$. When the pressure P of the pressure sensor 50 remains unchanged from that in the stage K, it is determined that the purge valve 36 does not communicate therein, even though being supplied with electricity. That is, the purge valve 36 is determined to malfunction.

When a malfunction is caused in any of the components for measuring the fuel vapor concentration, the malfunction is desirably notified to the driver of the vehicle by lighting up the warning lamp or producing the warning sound, for example. A malfunction flag may be set for every component in the EEPROM or the like of the ECU 60, and may be turned ON so as to specify the malfunction portion.

In the above structure, the components for measuring the fuel vapor concentration serve also as components for performing the leak check operation, so that additional components for performing the leak check operation can be reduced.

The pressure sensor 50 is diagnosed, and thereafter, when the pressure sensor 50 is normal, the other components for measuring the fuel vapor concentration are diagnosed on the basis of the detection signal of the pressure sensor 50. Therefore, additional components or modules for performing the malfunction diagnoses are not needed.

The fuel vapor treatment apparatus 30 has the measurement passage 112 separately from the purge passage 102 through which fuel vapor produced in the fuel tank 32 is purged into the intake passage 14.

When the measurement passage 112 is blocked from the intake passage 14, fuel vapor produced in the fuel tank 32 flows through the measurement passage 112. The physical quantities correlating to the fuel vapor state are detected in the measurement passage 112 for measuring the fuel vapor state. Accordingly, the fuel vapor state can be precisely measured, irrespective of the fluctuation in negative pressure in the intake passage 14. Here, the components of the state measuring unit, which includes the pump 42, the solenoid valve 44, the pressure sensor 50, the ECU 60, the measurement passage 112, and the like, for measuring the fuel vapor state are diagnosed. Therefore, when any of the components is malfunction, an appropriate process such as the malfunction warning, malfunction recording, or purge suspension can be performed.

The ECU 60 serving as the diagnosis unit performs the diagnosis of the pressure detecting unit immediately after starting the engine 10. Therefore, a malfunction of the state measuring unit can be found out at an early state, and the appropriate process can be performed.

Modified Embodiment

Figure 14:
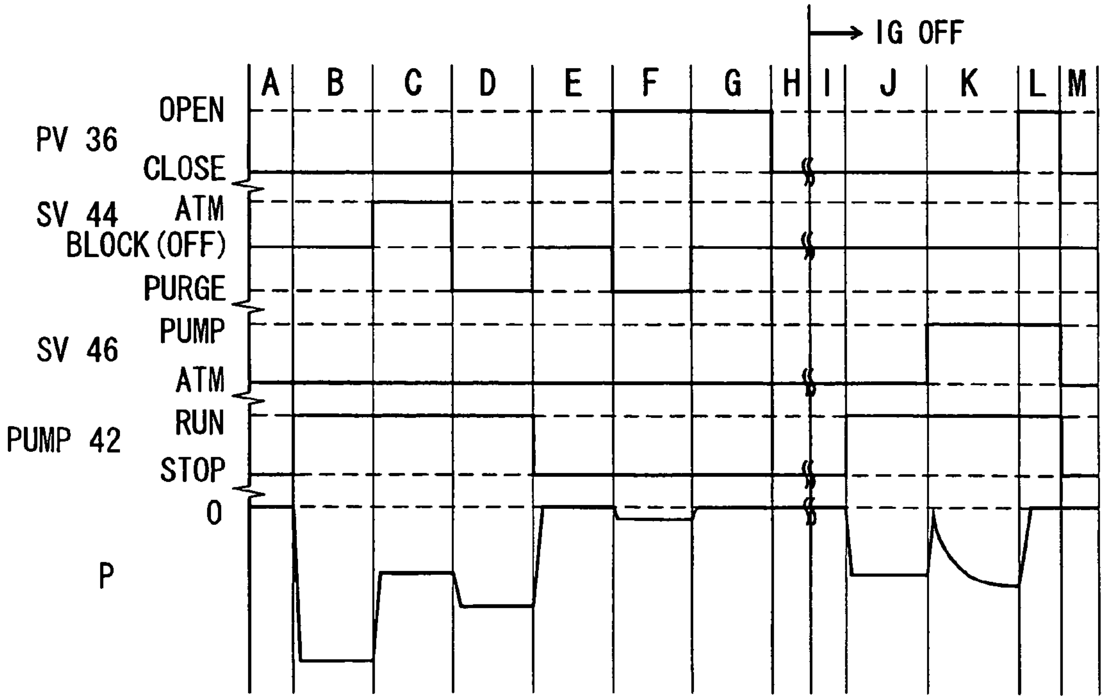
FIG. 14 is a time chart showing an operation of a fuel vapor treatment apparatus according to a modified embodiment.

In the first embodiment, the throttle 40 communicates with the atmosphere through the solenoid valve 44 when supplying electricity to the solenoid valve 44 is terminated. Alternatively, the solenoid valve 44 may block the throttle 40 from the atmosphere when supplying electricity to the solenoid valve 44 is terminated. In this case, the measurement of the fuel vapor concentration, the purge and the leak check operation are performed in accordance with a time chart shown in FIG. 14.

Second Embodiment

Figure 15:
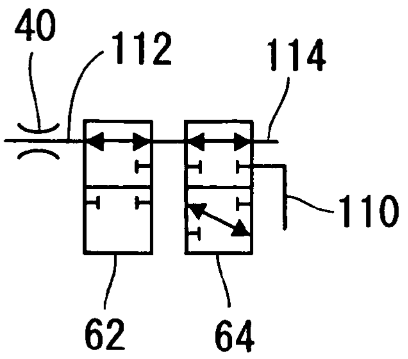
FIG. 15 is a schematic view showing solenoid valves for a fuel treatment apparatus according to a second embodiment.

As shown in FIG. 15, the solenoid valve 44 in the first embodiment may be replaced with solenoid valves 62 and 64. In this case, the malfunction of the solenoid valve 44 in the first embodiment may be replaced with a malfunction caused in at least one of the solenoid valves 62 and 64.

Third Embodiment

Figure 16:
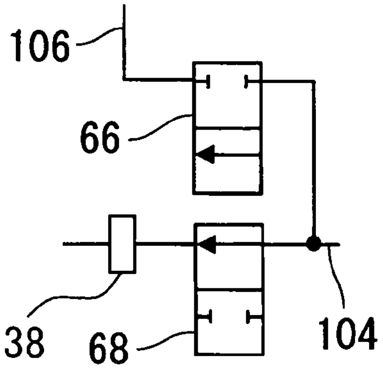
FIG. 16 is a schematic view showing solenoid valves for a fuel treatment apparatus according to a third embodiment.

As shown in FIG. 16, the solenoid valve 46 in the first embodiment may be replaced with solenoid valves 66 and 68. In this case, the malfunction of the solenoid valve 46 in the first embodiment may be replaced with a malfunction caused in at least one of the solenoid valves 66 and 68.

Fourth Embodiment

Figure 18:
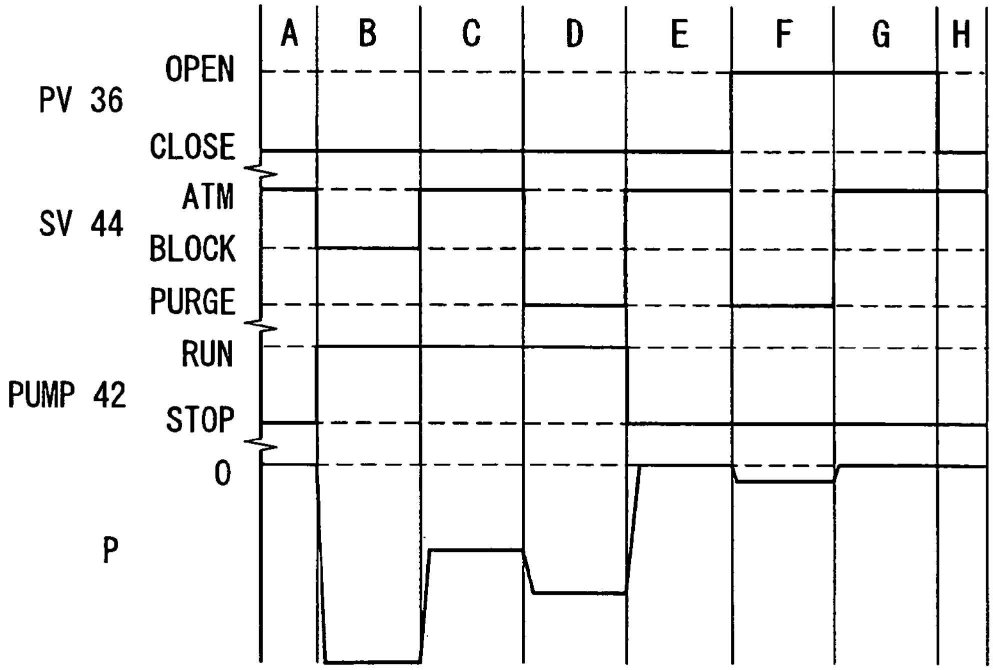
FIG. 18 is a time chart showing an operation according to the fourth embodiment.
Figure 17:
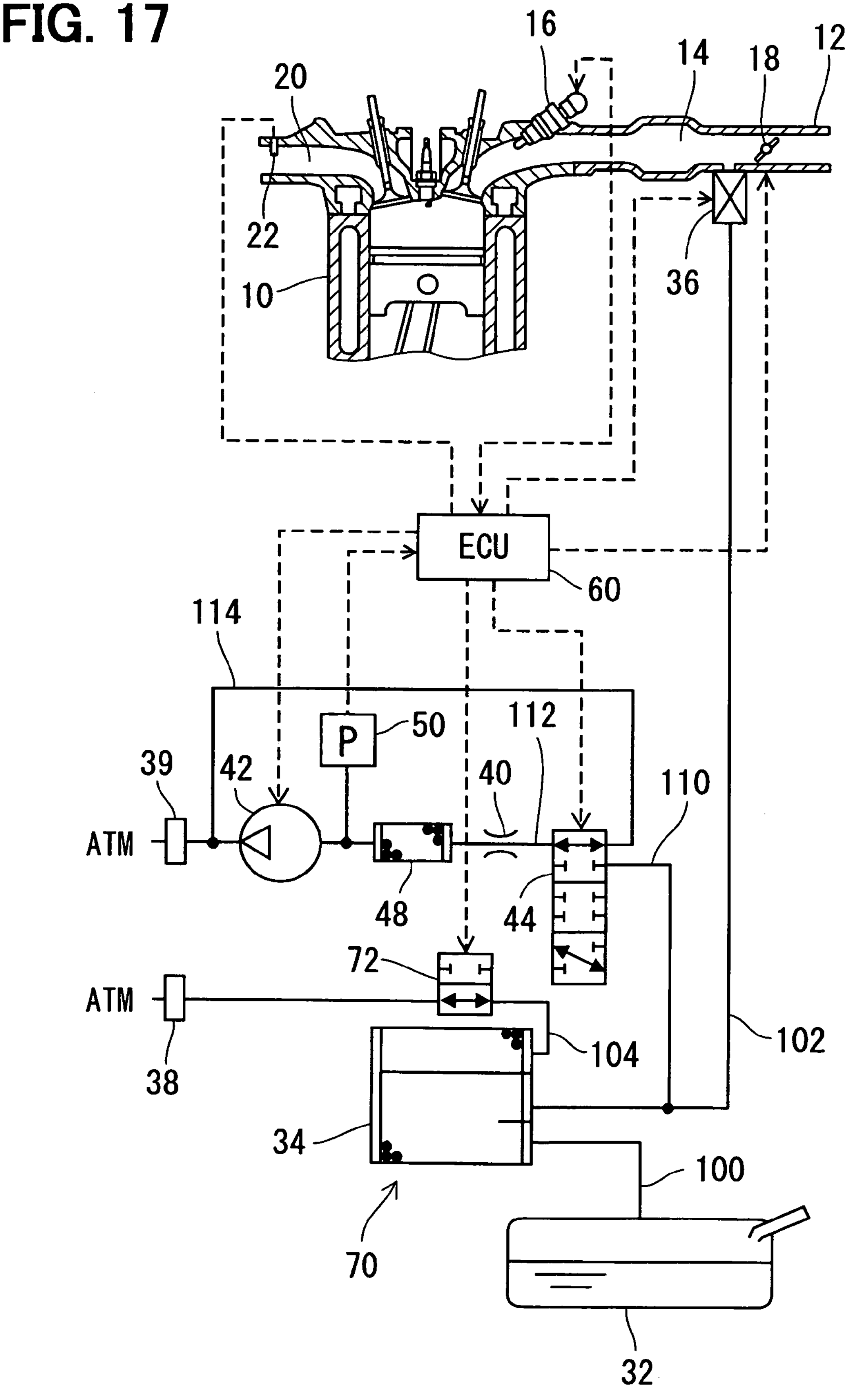
FIG. 17 is a schematic view showing a fuel vapor treatment apparatus, according to a fourth embodiment.

As shown in FIG. 17, a fuel vapor treatment apparatus 70 includes a solenoid valve 72 for interrupting the communication between the first canister 34 and the atmosphere. In the fourth embodiment, the components for measuring the fuel vapor concentration are not used for the leak check operation of the purge system. The time chart of the fourth embodiment as shown in FIG. 18 depicts only the fuel vapor concentration measurement and the purge.

Other Embodiments

The fuel tank 32 may connect with the intake passage 14 through the purge valve 36. In this structure, fuel vapor in the fuel tank 32 may be purged into the intake passage 14 directly through the purge passage 102 without intervention of the first canister 34, while fuel vapor produced in the fuel tank 32 is adsorbed to the first canister 34. Also in this case, the fuel vapor concentration in the fuel tank 32 is measured using the state measuring unit so as to control the purge valve 36 and the injection quantity of the fuel injection valve 16.

The pump 42 is used for decreasing pressure in the measurement passage 112. Alternatively, the pump 42 may be used for increasing pressure of the measurement passage, in a particular structure of the state measuring unit for measuring the fuel vapor concentration.

An absolute pressure sensor may be used as the pressure detecting unit.

The fuel vapor concentration may be measured in accordance with the air pressure and the mixture pressure. In this case, it is desirable to control the rotation speed of the pump 42 at a constant speed. The flow rate in the measurement passage may be adopted as a physical quantity for measuring the fuel vapor concentration. A fuel vapor state other than the fuel vapor concentration may be obtained by measuring the pressure or flow rate in the measurement passage.

The second canister 48 may not be provided to the fuel vapor processing apparatus.

In the above embodiments, the pump 42 is used for the leak check operation of the fuel vapor treatment apparatus, in addition for the measurement of the fuel vapor concentration.

Alternatively, an additional pump other than the pump 42 may be employed for performing the leak check operation of the fuel vapor treatment apparatus.

The respective functions of the above unit may be constructed of hardware resources, programs, or a combination of the hardware resources and programs. The respective functions of the units are not restricted to ones, which are hardware resources that are physically independent of one another.

The above structures of the embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A fuel vapor treatment apparatus connecting with a fuel tank, which produces fuel vapor to be purged into an intake passage of an internal combustion engine through a purge passage, the fuel vapor treatment apparatus comprising:

a state measuring unit that includes a measurement passage provided separately from the purge passage, wherein when the measurement passage is blocked from the intake passage, the state measuring unit measures a state of fuel vapor by detecting a physical quantity of the fuel vapor in the measurement passage, the physical quantity being correlative to the state of fuel vapor, the fuel vapor treatment apparatus further comprising:

a diagnosis unit for diagnosing a malfunction of at least one of components of the state measuring unit.

2. The fuel vapor treatment apparatus as defined in claim 1, further comprising:

a canister for adsorbing fuel vapor produced in the fuel tank, wherein fuel vapor adsorbed to the canister is purged into the intake passage through the purge passage, and fuel vapor adsorbed in the canister flows through the measurement passage.

3. The fuel vapor treatment apparatus as defined in claim 1, wherein the state of fuel vapor is concentration of fuel vapor.

4. The fuel vapor treatment apparatus as defined in claim 1, wherein the measurement passage includes a throttle therein, the state measuring unit further includes:

a first switching valve that connects with the measurement passage, the first switching valve adapted to communicating the throttle with selectively one of the atmosphere and the purge passage;

a flow generating unit for generating fluid flow through the measurement passage; and a pressure detecting unit for detecting pressure in the measurement passage, wherein the pressure detecting unit detects an air pressure when the following conditions are satisfied:

the flow generating unit operates; and the first switching valve communicates the throttle with the atmosphere, wherein the pressure detecting unit detects a mixture pressure of mixture including air and fuel vapor when the following conditions are satisfied:

purge of fuel vapor into the intake passage through the purge passage is suspended; and the first switching valve communicates the throttle with the purge passage, wherein the state measuring unit controls a quantity of fuel vapor to be purged into the intake passage on the basis of the air pressure and the mixture pressure.

5. The fuel vapor treatment apparatus as defined in claim 4, wherein the state measuring unit further includes:

a concentration calculating unit for calculating concentration of fuel vapor in the mixture on the basis of the air pressure and the mixture pressure.

6. The fuel vapor treatment apparatus as defined in claim 4, further comprising:

a second switching valve adapted to communicating the flow generating unit with the purge passage, the second switching valve adapted to blocking the flow generating unit from the purge passage, wherein the first switching valve is adapted to blocking among the throttle, the atmosphere, and the purge passage from each other, the pressure detecting unit detects reference pressure when the following conditions are satisfied:

the flow generating unit operates;

the first switching valve communicates the throttle with the atmosphere; and the second switching valve blocks the flow generating unit from the purge passage, wherein the pressure detecting unit detects first pressure when the following conditions are satisfied:

the first switching valve blocks among the throttle, the atmosphere, and the purge passage from each other; and the second switching valve communicates the flow generating unit with the purge passage, the fuel vapor treatment apparatus further includes:

a leak check unit for detecting leak in the fuel vapor treatment apparatus and the fuel tank on the basis of the reference pressure and the first pressure, wherein the diagnosis unit diagnoses a malfunction of the second switching valve.

7. The fuel vapor treatment apparatus as defined in claim 4, wherein when the pressure detecting unit is normal, the diagnosis unit diagnoses a malfunction of any of the components other than the pressure detecting unit on the basis of pressure detected by the pressure detecting unit in the measurement of the state of fuel vapor.

8. The fuel vapor treatment apparatus as defined in claim 4, wherein the diagnosis unit diagnoses a malfunction of the pressure detecting unit on the basis of a detection signal of the pressure detecting unit immediately after starting the internal combustion engine.

9. The fuel vapor treatment apparatus as defined in claim 4, wherein the diagnosis unit diagnoses a malfunction of at least one of the flow generating unit and the first switching valve on the basis of pressure detected by the pressure detecting unit when the following conditions are satisfied:

the flow generating unit operates; and the first switching valve blocks among the throttle, the atmosphere, and the purge passage from each other.

10. The fuel vapor treatment apparatus as defined in claim 4, wherein the diagnosis unit diagnoses a malfunction of at least one of the flow generating unit and the first switching valve on the basis of a change rate in pressure detected by the pressure detecting unit when the following conditions are satisfied:

the flow generating unit operates; and the first switching valve switches to block among the throttle, the atmosphere, and the purge passage from each other.

11. The fuel vapor treatment apparatus as defined in claim 4, wherein the diagnosis unit diagnoses a malfunction of at least one of the flow generating unit, the first switching valve, and the throttle on the basis of pressure detected by the pressure detecting unit when the following conditions are satisfied:

the flow generating unit operates; and the first switching valve communicates the throttle with the atmosphere.

12. The fuel vapor treatment apparatus as defined in claim 4, wherein the diagnosis unit diagnoses a malfunction of at least one of the flow generating unit and the first switching valve on the basis of a change rate in pressure detected by the pressure detecting unit when the following conditions are satisfied:

the flow generating unit operates; and the first switching valve switches to communicate the throttle with the atmosphere.

13. The fuel vapor treatment apparatus as defined in claim 4, wherein the diagnosis unit diagnoses a malfunction of at least one of the flow generating unit, the first switching valve, and the throttle on the basis of pressure detected by the pressure detecting unit when the following conditions are satisfied:

the flow generating unit operates; and the first switching valve communicates the throttle with the purge passage.

14. The fuel vapor treatment apparatus as defined in claim 4, further comprising:

a purge valve that is provided in the purge passage for controlling a quantity of fuel vapor to be purged into the intake passage, wherein the diagnosis unit diagnoses a malfunction of at least one of the purge valve and the first switching valve on the basis of pressure detected by the pressure detecting unit when the following conditions are satisfied:

the first switching valve communicates the throttle with the purge passage; and fuel vapor is purged into the intake passage.

15. The fuel vapor treatment apparatus as defined in claim 4, wherein the diagnosis unit diagnoses a malfunction of the first switching valve on the basis of pressure detected by the pressure detecting unit when the following conditions are satisfied:

the first switching valve blocks the throttle from the purge passage;

the first switching valve communicates the throttle with the atmosphere; and fuel vapor is purged into the intake passage.

16. The fuel vapor treatment apparatus as defined in claim 6, wherein the diagnosis unit diagnoses a malfunction of the second switching valve on the basis of pressure detected by the pressure detecting unit when the following conditions are satisfied:

the first switching valve communicates the throttle with the purge passage; and fuel vapor is purged into the intake passage.

17. The fuel vapor treatment apparatus as defined in claim 6, wherein the diagnosis unit diagnoses a malfunction of the second switching valve on the basis of pressure detected by the pressure detecting unit when the following conditions are satisfied:

fuel vapor is purged into the intake passage;

the first switching valve blocks the throttle from the purge passage; and the first switching valve communicates the throttle with the atmosphere.

18. The fuel vapor treatment apparatus as defined in claim 6, wherein the diagnosis unit diagnoses a malfunction of at least one of the flow generating unit, the first switching valve, and the second switching valve on the basis of pressure detected by the pressure detecting unit when the following conditions are satisfied:

the flow generating unit operates; and the second switching valve communicates the flow generating unit with the purge passage.

19. The fuel vapor treatment apparatus as defined in claim 6, further comprising:

a purge valve that is provided in the purge passage for controlling a quantity of fuel vapor purged into the intake passage, wherein the pressure detecting unit detects second pressure when the following conditions are satisfied:

the flow generating unit operates;

the second switching valve communicates the flow generating unit with the purge passage; and the purge valve communicates therein, wherein the diagnosis unit diagnoses a malfunction of the purge valve on the basis of the second pressure.

20. A fuel vapor treatment system for an internal combustion engine connecting with a fuel tank, the internal combustion engine drawing air through an intake passage, the fuel vapor treatment system comprising:

a fuel vapor treatment apparatus that includes a purge passage through which fuel vapor produced in the fuel tank is purged into the intake passage, wherein the fuel vapor treatment apparatus further includes a measurement passage trough which fuel vapor flows from the fuel tank, the fuel vapor treatment apparatus further includes a sensing unit for detecting a state of the fuel vapor in the measurement passage when the measurement passage is blocked from the intake passage, and the sensing unit diagnoses a malfunction of the fuel vapor treatment apparatus in accordance with the state of the fuel vapor.

21. A method for operating a fuel vapor treatment system including a fuel vapor treatment apparatus for purging fuel vapor produced in a fuel tank into an intake passage of an internal combustion engine through a purge passage, the method comprising:

introducing fuel vapor from the fuel tank into a measurement passage in a condition where the measurement passage is blocked from the intake passage;

measuring a state of the fuel vapor in the measurement passage by detecting a physical quantity correlative to the state of fuel vapor; and diagnosing a malfunction of at least one of components constructing the fuel vapor treatment apparatus in accordance with the state of fuel vapor.

* * * * *